US008798288B2

(12) United States Patent
Nagasawa et al.

(10) Patent No.: US 8,798,288 B2
(45) Date of Patent: Aug. 5, 2014

(54) VOICE OUTPUT DEVICE

(75) Inventors: Sinnosuke Nagasawa, Osaka (JP); Yoshio Nakamura, Mie (JP)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 13/128,651

(22) PCT Filed: Nov. 24, 2009

(86) PCT No.: PCT/JP2009/006302
§ 371 (c)(1),
(2), (4) Date: May 11, 2011

(87) PCT Pub. No.: WO2010/061569
PCT Pub. Date: Jun. 3, 2010

(65) Prior Publication Data

US 2011/0211710 A1 Sep. 1, 2011

(30) Foreign Application Priority Data

Nov. 26, 2008 (JP) ................................ 2008-300498

(51) Int. Cl.
*H04B 1/00* (2006.01)
*G10K 15/02* (2006.01)
*H04R 3/12* (2006.01)
*H04R 3/04* (2006.01)

(52) U.S. Cl.
CPC . *G10K 15/02* (2013.01); *H04R 3/04* (2013.01); *H04R 3/12* (2013.01); *H04R 2499/13* (2013.01)
USPC ............................................................ 381/86

(58) Field of Classification Search
CPC .......... G10K 15/02; G10K 2210/1282; G10K 2210/3044; H04R 2499/13; H04R 3/04
USPC ............................................................ 381/86
See application file for complete search history.

(56) References Cited

U.S. PATENT DOCUMENTS 5,083,311 A 1/1992 Kasai et al.
6,038,325 A 3/2000 Yoshida et al.
(Continued)

FOREIGN PATENT DOCUMENTS

EP 1443493 A1 8/2004
EP 1705644 B1 4/2008
(Continued)

OTHER PUBLICATIONS

International Search Report for Application No. PCT/JP2009/006302. Dec. 28, 2009, Panasonic Corporation.

*Primary Examiner* — Joseph Saunders, Jr.
(74) *Attorney, Agent, or Firm* — RatnerPrestia

(57) ABSTRACT

A sound output device is configured to be installed in a vehicle. The sound output device includes a driving-status detector for detecting a driving status of the vehicle, a sound signal generator for generating a reference signal in response to the detected driving status, first and second units for processing the generated reference signal, first and second sound output parts for outputting the reference signals processed by the first and second units. The first unit includes a phase shifter for shifting a phase of the reference signal such that the reference signals output from the first sound output part and the second sound output part have a phase difference between the respective reference signals. This sound output device allows a passenger at a predetermined position to hear the sound in a preferable condition.

2 Claims, 10 Drawing Sheets

(56) References Cited

U.S. PATENT DOCUMENTS

| | | | | |
|---|---|---|---|---|
| 6,944,303 | B2 * | 9/2005 | Akiho | 381/71.14 |
| 2004/0158470 | A1 | 8/2004 | Kawahara et al. | |
| 2006/0215846 | A1 | 9/2006 | Kobayashi et al. | |

FOREIGN PATENT DOCUMENTS

| | | | |
|---|---|---|---|
| JP | 62-081197 | A | 4/1987 |
| JP | 1-151399 | A | 6/1989 |
| JP | 01-151399 | A | 6/1989 |
| JP | 02-158296 | A | 6/1990 |
| JP | 04-022295 | A | 1/1992 |
| JP | 05-080790 | A | 4/1993 |
| JP | 10-224887 | A | 8/1998 |
| JP | 11-051399 | A | 2/1999 |
| JP | 2004-233624 | A | 8/2004 |
| JP | 2006-301598 | A | 11/2006 |

* cited by examiner

FIG. 4

| Time | Value |
|---|---|
| 0 | 0.000000 |
| 1 | 0.002094 |
| 2 | 0.004189 |
| 3 | 0.006283 |
| 4 | 0.008377 |
| 5 | 0.010472 |
| ⋮ | ⋮ |
| 750 | 1.000000 |
| ⋮ | ⋮ |
| 1500 | 0.000000 |
| 1501 | -0.002094 |
| 1502 | -0.004189 |
| 1503 | -0.006283 |
| ⋮ | ⋮ |
| 2999 | -0.002094 |

VOICE OUTPUT DEVICE

THIS APPLICATION IS A U.S. NATIONAL PHASE APPLICATION OF PCT INTERNATIONAL APPLICATION PCT/JP2009/006302.

TECHNICAL FIELD

The present invention relates to a sound output device for outputting sounds, such as simulated engine sounds, in a vehicle, such as an automobile.

BACKGROUND ART

In recent years, in order to enhance the operation sense of the driver and create driving amenity inside a vehicle, such as an automobile, mainly automobile manufacturers have been proposing various techniques. A known technique among these proposals is to output a simulated engine sound from the sound output part incorporated in the vehicle in response to the driving status of the vehicle.

FIG. 11 is a block diagram of conventional sound output device 501 disclosed in Patent Literature 1. Sound output device 501 includes driving-status detector 101, sound signal generator 102, sound level adjusters 104A and 104B, and speakers 105A and 105B connected to sound level adjusters 104A and 104B, respectively. In response to the driving status of the vehicle detected by driving-status detector 101, sound signal generator 102 generates a simulated engine sound. The generated simulated engine sound is adjusted by sound level adjusters 104A and 104B, and output from speakers 105A and 105B.

By outputting the simulated engine sound, sound output device 501 emphasizes, to the driver of vehicle 106, the sound with which the number of rotations of the engine is changed by the operation of the accelerator, and enhances the operation sense of the driver of vehicle 106. Further, by mixing the simulated engine sound with an original engine sound, sound output device 501 creates an engine sound having comfortable frequency characteristics for the driver and improves the driving amenity of the driver.

In FIG. 11, components, such as driving-status detector 101, of sound output device 501, are shown outside vehicle 106. However, actually, these components are installed inside vehicle 106 similarly to speakers 105A and 105B.

In conventional sound output device 501, the simulated engine sound output from speakers 105A and 105B interferes with the sound reflected on an inside, such as wall surfaces, of vehicle 106, and produces a peak or a dip at a specific frequency of the output sound. As a result, passengers sitting at predetermined positions, such as a driver seat and a front passenger seat, may not hear a desirable simulated engine sound.

CITATION LIST

Patent Literature

Patent Literature 1: Japanese Patent Laid-Open Publication No. 02-158296

SUMMARY OF INVENTION

A sound output device is configured to be installed in a vehicle. The sound output device includes a driving-status detector for detecting a driving status of the vehicle, a sound signal generator for generating a reference signal in response to the detected driving status, first and second units for processing the generated reference signal, first and second sound output parts for outputting the reference signals processed by the first and second units. The first unit includes a phase shifter for shifting a phase of the reference signal such that the reference signals output from the first sound output part and the second sound output part have a phase difference between the respective reference signals.

This sound output device allows a passenger at a predetermined position to hear the sound in a preferable condition.

BRIEF DESCRIPTION OF DRAWINGS

FIG. 4 shows a data table representing the data shown in FIG. 3.

DETAIL DESCRIPTION OF PREFERRED EMBODIMENT

Figure 1:
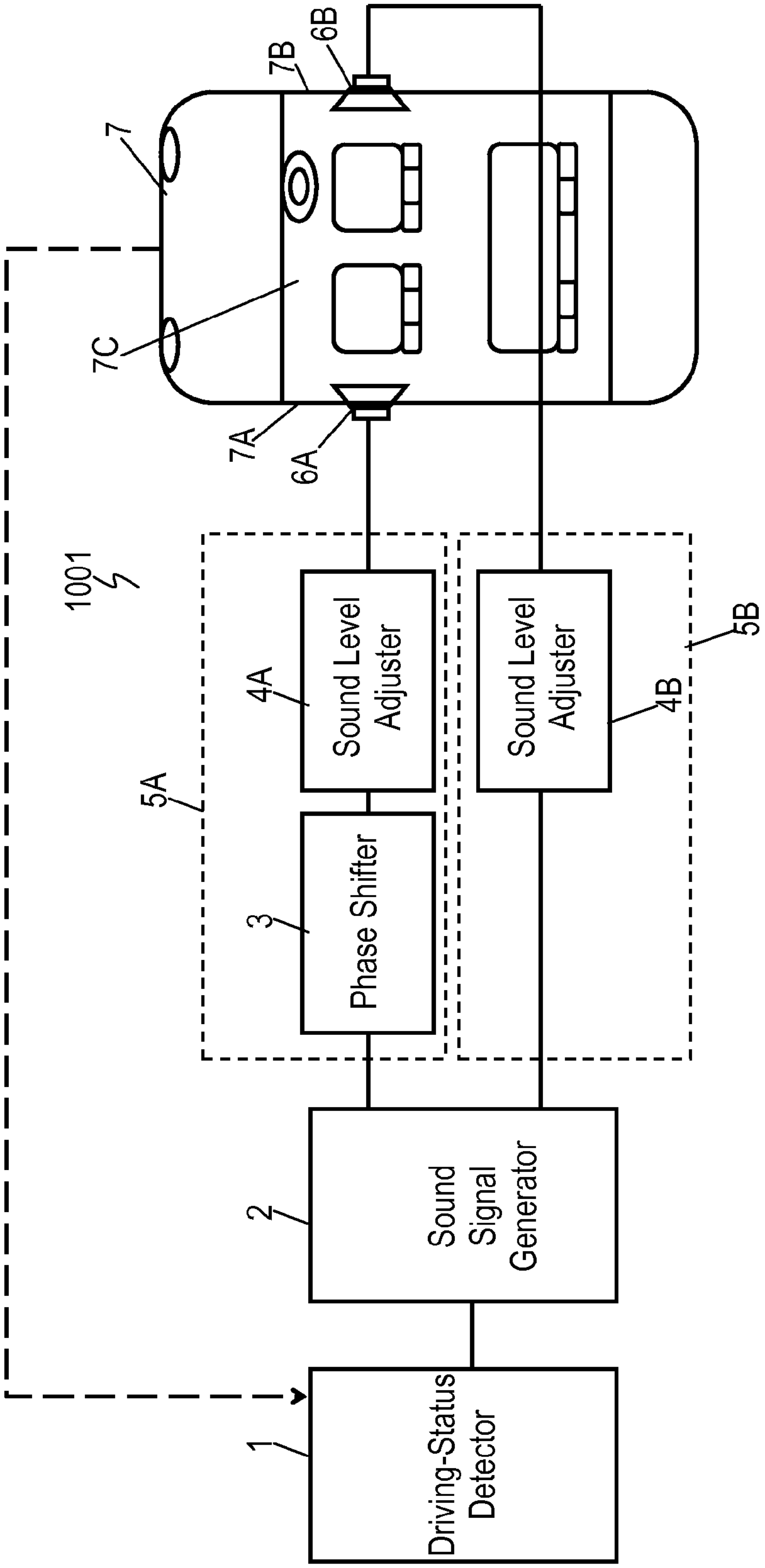
FIG. 1 is a block diagram of a sound output device according to an exemplary embodiment of the present invention.

FIG. 1 is a block diagram of sound output device 1001 according to an exemplary embodiment of the present invention. Sound output device 1001 includes driving-status detector 1, sound signal generator 2, phase shifter 3, sound level adjusters 4A and 4B, and speakers 6A and 6B. Phase shifter 3 and sound level adjuster 4A constitute unit 5A. Sound level adjuster 4B constitutes 5B. Speakers 6A and 6B are connected to units 5A and 5B, respectively. Sound output device 1001 is installed in vehicle 7. In FIG. 1, components, such as sound signal generator 2, of sound output device 1001 are shown outside vehicle 7. However, these components are installed in vehicle 7 similarly to speakers 6A and 6B. Speakers 6A and 6B are disposed on wall surfaces 7A and 7B, respectively, which face each other across vehicle cabin space 7C of vehicle 7. The speakers output a sound in directions opposed to each other.

Speakers 6A and 6B are sound output parts each for outputting a simulated engine sound from sound output device 1001 to an inside of vehicle 7, and are disposed on a door of a front passenger seat and a door of a driver seat of vehicle 7, respectively. Speakers 6A and 6B output a sound signal output from units 5A and 5B, respectively, actually as a sound. Speakers 6A and 6B may be disposed on left and right doors of a rear seat of vehicle 7, respectively.

Driving-status detector 1 detects a driving status, i.e. a status in which vehicle 7 is driven. Specifically, driving-status detector 1 detects a running status of vehicle 7, such as the number of rotations of the engine, information on the degree of opening of the accelerator, and the acceleration of the vehicle. Further, based on the detected running status, the driving-status detector estimates a load on the actual engine and a response status, and detects the driving status of vehicle 7.

Based on the driving status of vehicle 7 detected by driving-status detector 1, sound signal generator 2 generates a reference waveform of a simulated engine sound most suitable for an operating status of the driver who is driving vehicle 7. Sound signal generator 2 has a table representing the correlation between the driving status of vehicle 7 and data of the simulated engine sound. The sound signal generator refers the table based on the detected driving status, to determine and generate the reference waveform of a simulated engine sound. The data of the simulated engine sound is stored in sound signal generator 2 as elements, such as the frequency characteristics of the level, the frequency characteristics of the phase, and the orders of higher harmonic waves included in the simulated engine sound. Sound signal generator 2 generates, as the reference waveform, sinusoidal waves that have frequencies of higher harmonic waves of the necessary orders. Alternatively, the sound signal generator generates non-sinusoidal waves, such as rectangular waves or triangular waves, including plural higher harmonic components.

Sound level adjusters 4A and 4B in units 5A and 5B adjust the level of the reference waveform of the simulated engine sound generated in sound signal generator 2. In unit 5A, phase shifter 3 is connected at the stage subsequent to sound signal generator 2.

Sound output device 1001 of the embodiment includes two units 5A and 5B and two speakers 6A and 6B. The sound output device may have more than two units and speakers connected to these units.

Phase shifter 3 shifts the phase of the reference waveform generated by sound signal generator 2, and causes unit 5A to output a sound signal that has a predetermined phase difference from the sound signal output from at least one unit, such as unit 5B, of the units other than unit 5A. The phase characteristic, i.e. the amount of phase to be shifted by phase shifter 3 at each frequency, is a phase characteristic in response to the driving status of vehicle 7 detected by driving-status detector 1 in order to provide a simulated engine sound most suitable for the driving status of the driver.

Sound level adjuster 4A adjusts a gain at each frequency such that the level of the sound signal output from phase shifter 3 has a predetermined frequency characteristic. Similarly, sound level adjuster 4B adjusts a gain at each frequency such that the level of the sound signal generated in sound signal generator 2 has a predetermined frequency characteristic. The predetermined frequency characteristic is a frequency characteristic in response to the driving status of vehicle 7 detected by driving-status detector 1, similar to the phase characteristic in phase shifter 3.

An operation of sound output device 1001 according to the embodiment will be described below.

When a driver drives vehicle 7, data, such as the degree of opening of the accelerator by the driver, the number of rotations of the engine of vehicle 7, and the acceleration, regarding the running of vehicle 7 is output as a signal to driving-status detector 1. Driving-status detector 1 detects a current driving status of vehicle 7 cased on this signal.

The driving status of the vehicle detected by driving-status detector 1 is output to sound signal generator 2 as a signal. Based on this signal, sound signal generator 2 generates a sound signal that causes speakers 6A and 6B to output a sound, such as a simulated engine sound.

In unit 5A, phase shifter 3 corrects the phase of the sound signal, and sound level adjuster 4A adjusts the level of the sound signal at each frequency.

In unit 5B, sound level adjuster 4B adjusts the level of the sound signal generated in sound signal generator 2, at each frequency. Unit 5B does not include phase shifter 3, and does not correct the phase of the sound signal.

The signals output from units 5A and 5B are output from speakers 6A and 6B, as a sound, respectively.

Figure 2:
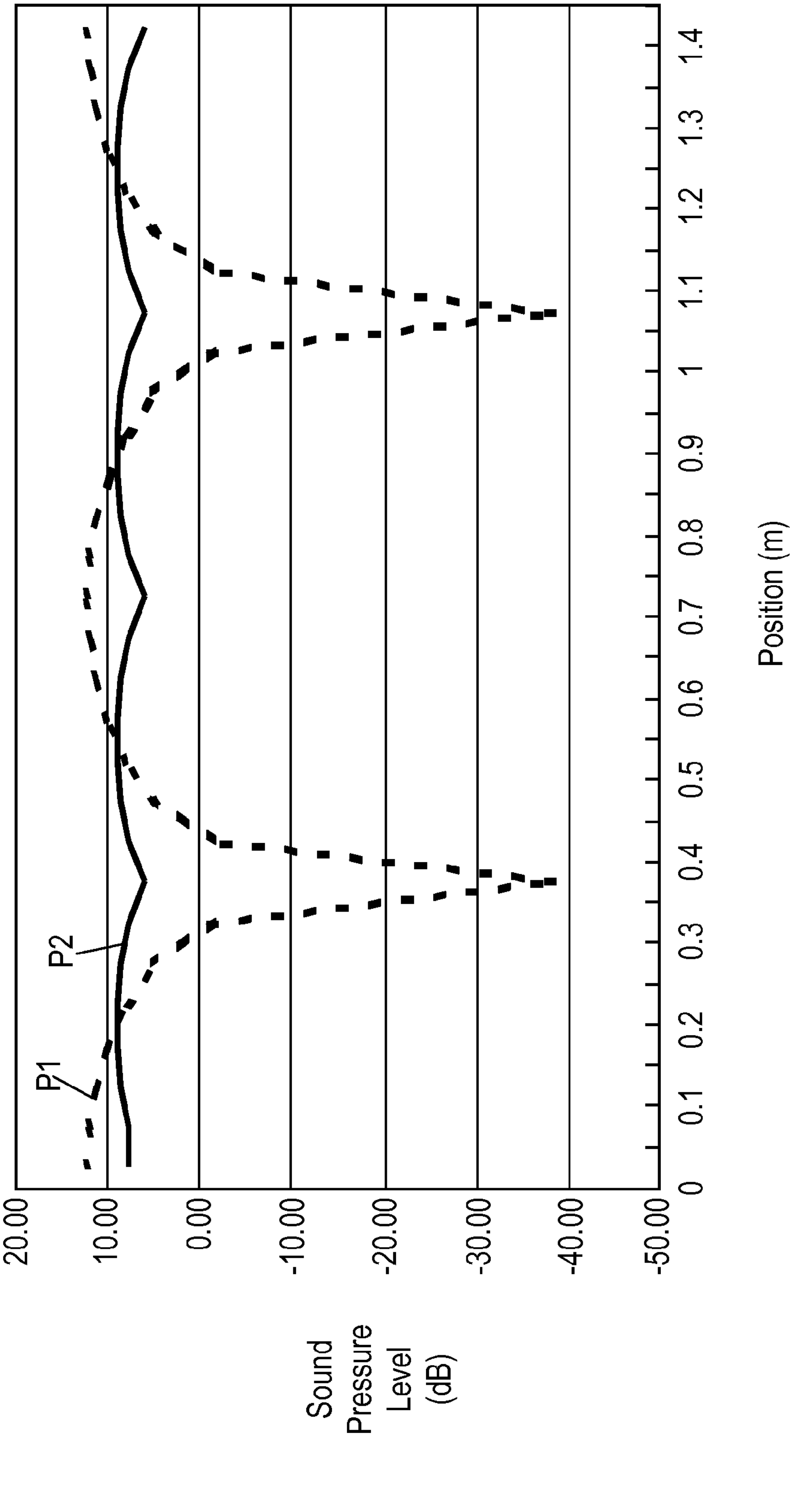
FIG. 2 shows a relation between a position inside a vehicle where the sound output device is disposed and a sound pressure according to the embodiment.

FIG. 2 shows a relation between a position inside vehicle 7 having sound output device 1001 installed therein and a sound pressure of the simulated engine sound at a frequency of 250 Hz. That is, FIG. 2 shows a simulation model considering only acoustic interference where only reflection between wall surfaces 7A and 7B spaced apart from each by a distance of 1.4 m. In FIG. 2, the vertical axis represents a sound pressure, and the horizontal axis shows a distance from wall surface 7A between wall surfaces 7A and 7B. Properties P1 show a sound pressure level of a comparative example of a sound output device which does not include phase shifter correcting the phase. Properties P2 show a sound pressure level of sound output device 1001 including phase shifter 2 correcting the phase into the opposite phase.

The comparative example of the sound output device, upon speakers 6A and 6B outputting sounds of sinusoidal waves in the same phase at 250 Hz, produces dips occur at positions of about 0.35 m from wall surfaces 7A and 7B as shown by properties P1. If the front passenger seat and the driver seat are apart from wall surfaces 7A and 7B by a distance of 0.35 m, respectively, the passengers sitting on the driver seat and the front passenger seat hardly hear the simulated engine sound, i.e. a sound at a frequency of 250 Hz, thus not being provided with a preferable simulated engine sound.

In sound output device 1001 of the embodiment, the phase is corrected by phase shifter 3 such that the sound output from speaker 6A is opposite to the phase of the sound output from speaker 6B. This operation suppresses the influence of the acoustic interference inside vehicle 7, and reduces the dips significantly as shown by properties P2. As a result, the passengers can hear the sound at a frequency of 250 Hz without any problem.

Thus, units 5A and 5B process the reference signal generated by sound signal generator 2. Speakers 6A and 6B as sound output parts output the reference signals processed in units 5A and 5B, respectively. Phase shifter 3 shifts the phase of the reference signal such that the reference signals output from speakers 6A and 6B have a phase difference between the signals.

Phase shifter 3 shifts the phase of the sound signal in the simulated engine sound, i.e. a sound including higher harmonic waves of plural orders, by the amounts corresponding to plural frequencies. This can suppress the dips and peaks in predetermined positions (apart by 0.35 m from wall surfaces 7A and 7B) inside vehicle 7. As a result, the passengers can hear the sound signal generated by sound signal generator 2, i.e. the simulated engine sound, in a preferable condition.

Figure 3:
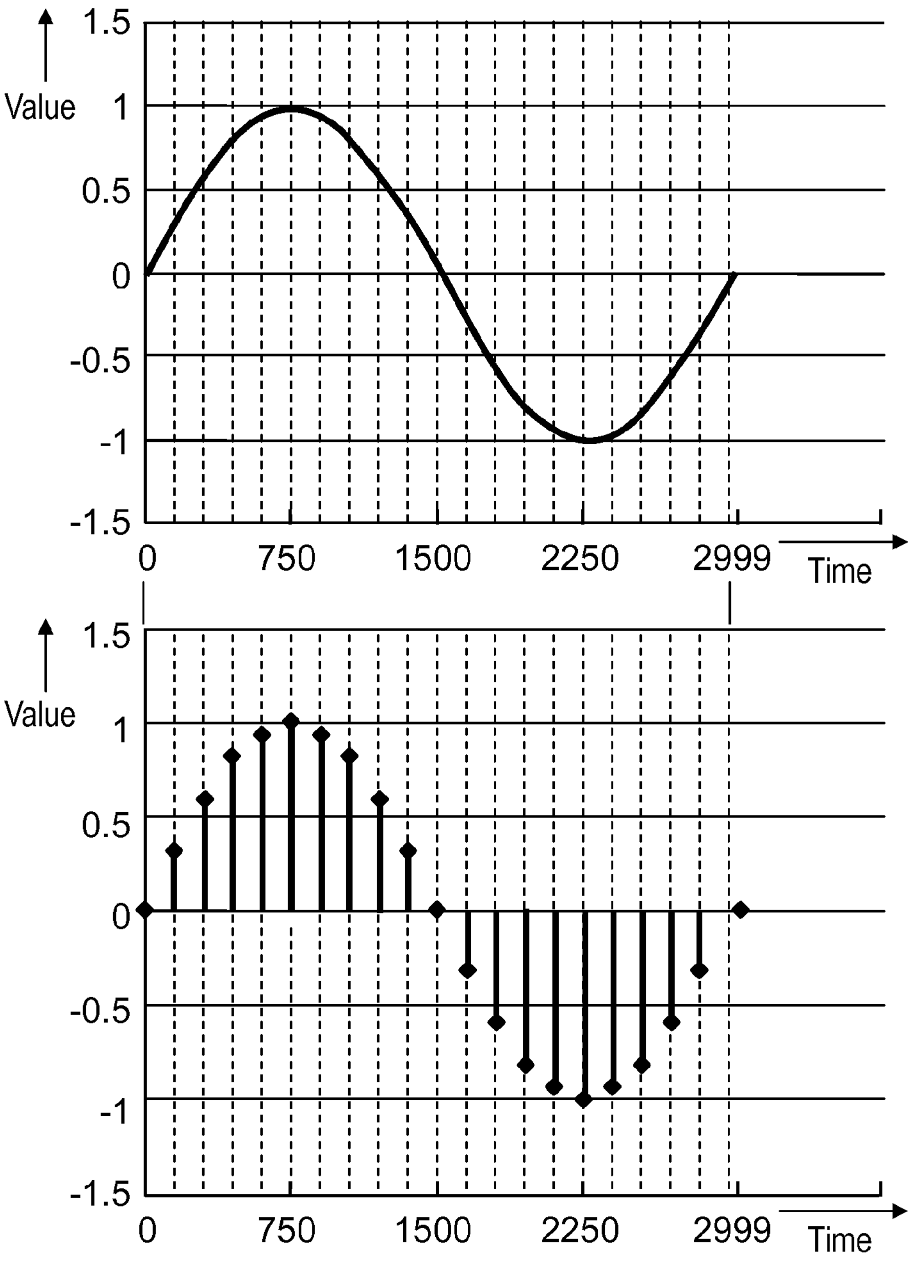
FIG. 3 shows data of a waveform of a reference signal stored in the sound output device according to the embodiment.

Sound signal generator 2 stores discrete data of one cycle of the waveform of the reference signal in a data table. In the case that the reference signal has a waveform, such as a sinusoidal wave, a triangular wave, or a square wave, having regularity, sound signal generator 2 can store data of at least ¼ of the cycle of the waveform to generate the reference signal. The data table stores points at which one cycle of the reference signal is sampled by output sampling periods at which sound signal generator 2 outputs the reference signal, and also stores plural sampling values of the level obtained by the sampling at these points. FIG. 3 shows a waveform of a sinusoidal wave, i.e. the reference signal. FIG. 3 also shows the waveform as plural sampling values stored in the data table. FIG. 4 shows the data table where sound signal generator 2 stores the waveform. In FIG. 3, the vertical axis represents a value of the reference signal, and the horizontal axis represents time. In the case that the output sampling period of the signal is 0.333 ms (3000 Hz), the data table contains 3000 sampling values representing the waveform of one cycle of a sinusoidal wave as shown in FIGS. 3 and 4. The number of the sampling values of the waveform may exceed the number of the output sampling period.

Sound signal generator 2 generates the reference signal by outputting sampling values from the data table by output sampling periods at intervals in response to the driving status detected by driving-status detector 1. For example, the 3000 sampling values representing one cycle of the sinusoidal wave at output sampling periods of 0.333 ms (3000 Hz) are stored in the data table. In this case, 3000 sampling values are extracted at intervals of 50 sampling values at sampling periods from the data table to generate a sinusoidal wave of 50 Hz.

Figure 5:
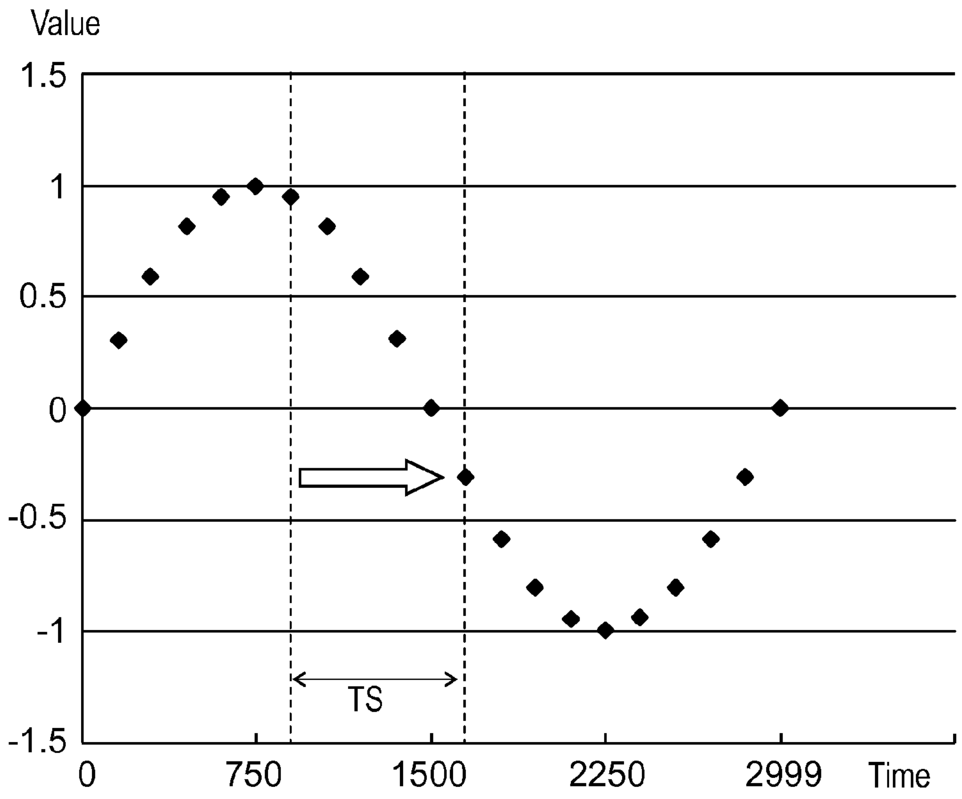
FIG. 5 shows an operation of a phase shifter of the sound output device according to the embodiment.

Phase shifter 3 of unit 5A extracts, from the sampling values stored in the data table, sampling values at points that are apart from the points at which unit 5B extracts sampling values from the data table by the amount of the phase to be shifted. Thereby, a phase difference corresponding to the amount can be provided. Phase shifter 3 of unit 5A extracts, from the data table, sampling values at the points apart from the points of the sampling value output from sound signal generator 2 to unit 5B by target number TS corresponding to the amount of phase to be shifted. Thereby, a sound signal having a phase shifted relative to the sound signal output to unit 5B can be output. FIG. 5 shows a waveform generated when the phase of the sound output from speaker 6A is shifted relative to the sound output from speaker 6B e.g., by $-\pi/2$. As shown in FIG. 5, unit 5A extracts sampling values at points apart by target number TS which corresponds to 750 ($=3000\times(\pi/2)/2\pi$) sampling values in the data table containing 3000 sampling values. Thereby, unit 5A can generate a sound signal having a phase shifted by $-\pi/2$ relative to the sound signal output from unit 5B.

Phase shifter 3 may store the amount of phase to be shifted, i.e. the maximum value of increment DTS of target number TS, every time one sampling value is extracted. In this case, phase shifter 3 can shift the phase of the sound signal by a predetermined amount by increasing target number TS by the maximum value of increment DTS every time one sampling value is extracted from the data table. Instead of storing the maximum value of increment DTS by which target number TS is increased every time one sampling value is extracted, phase shifter 3 may store the maximum value of increment DTS by which target number TS is increased every time plural sampling values is extracted.

Figure 6:
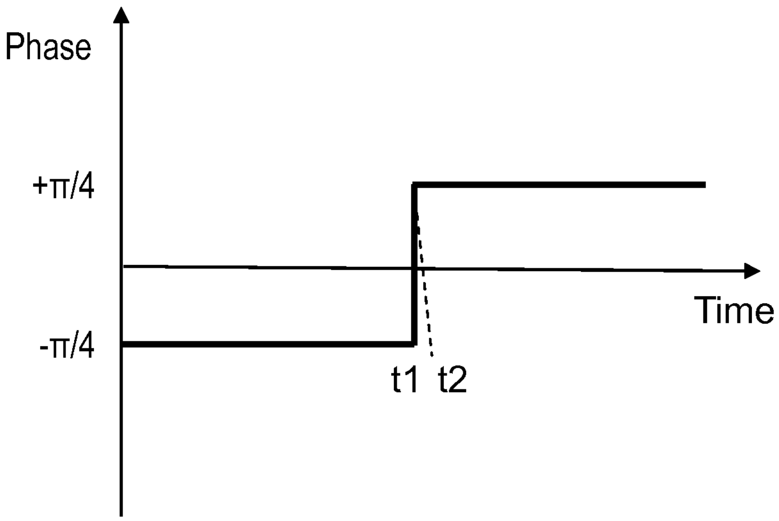
FIG. 6 shows a phase shifted by a phase shifter of a comparative example of a sound output device.

FIG. 6 shows a phase shifted by a phase shifter of a comparative example. The phase shifter of the comparative example shifts the phase by $+\pi/2$ from time point t1 to time point t2 which is a point after one sampling period. A steep phase shift for such a short period of time between time points t1 and t2 causes discontinuity of the sound signal, and thus generates an abnormal sound from speaker 6A.

Figure 7:
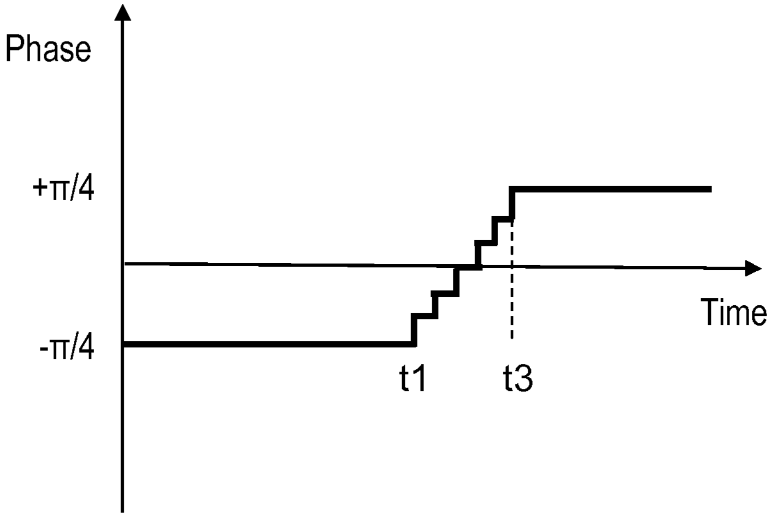
FIG. 7 shows a phase shifted by the phase shifter of the sound output device according to the embodiment.

FIG. 7 shows a phase shifted by phase shifter 3 of sound output device 1001 according to the embodiment. Phase shifter 3 stores an initial value and the maximum value of increment DTS of the amount of the phase to be shifted in the plural sampling periods. In FIG. 7, phase shifter 3 stores zero 0 as the initial value, and the maximum value of increment DTS of the amount of shift corresponding to $\pi/60$ in twelve sampling periods. When phase shifter 3 shifts the phase by $\pi/2$, the phase shifter increases the amount of shift from the initial value (0) by increments of $\pi/60$ during twelve sampling periods. That is, at time point t3 when 360 ($=12\times(\pi/2)/(\pi/60)$) sampling periods elapses from time point t1, the amount of the phase to be sifted, i.e. target number TS, is increased by $\pi/2$. By gradually increasing the amount of phase to be shifted in this manner, the discontinuity of the sound signal is reduced and no abnormal sound is generated from speaker 6A even when a large amount of phase is shifted.

Thus, unit 5A generates the reference signal by extracting plural sampling values at output sampling periods from the data table at intervals in response to the detected driving status. Unit 5B generates the reference signal by extracting plural sampling values at the output sampling periods from the data table at the intervals. Phase shifter 3 sets a point out of the plural points to be extracted by unit 5A such that the point is apart from the point to be extracted by unit 5B by a number corresponding to the phase in response to the detected driving status. Further, phase shifter 3 sets the point to be extracted by unit 5A apart from the point to be extracted by unit 5B by a number obtained by accumulating predetermined increment DTS at the output sampling periods toward target number TS. That is, phase shifter 3 operates to accumulate predetermined increment DTS from the initial value until the number obtained by accumulating predetermined increment DTS from the initial value (0) at the output sampling periods reaches target number TS. Phase shifter 3 operates to set the point to be extracted by unit 5A apart from the point to be extracted by unit 5B by the number obtained by accumulating predetermined increment DTS from the initial value.

Figure 8:
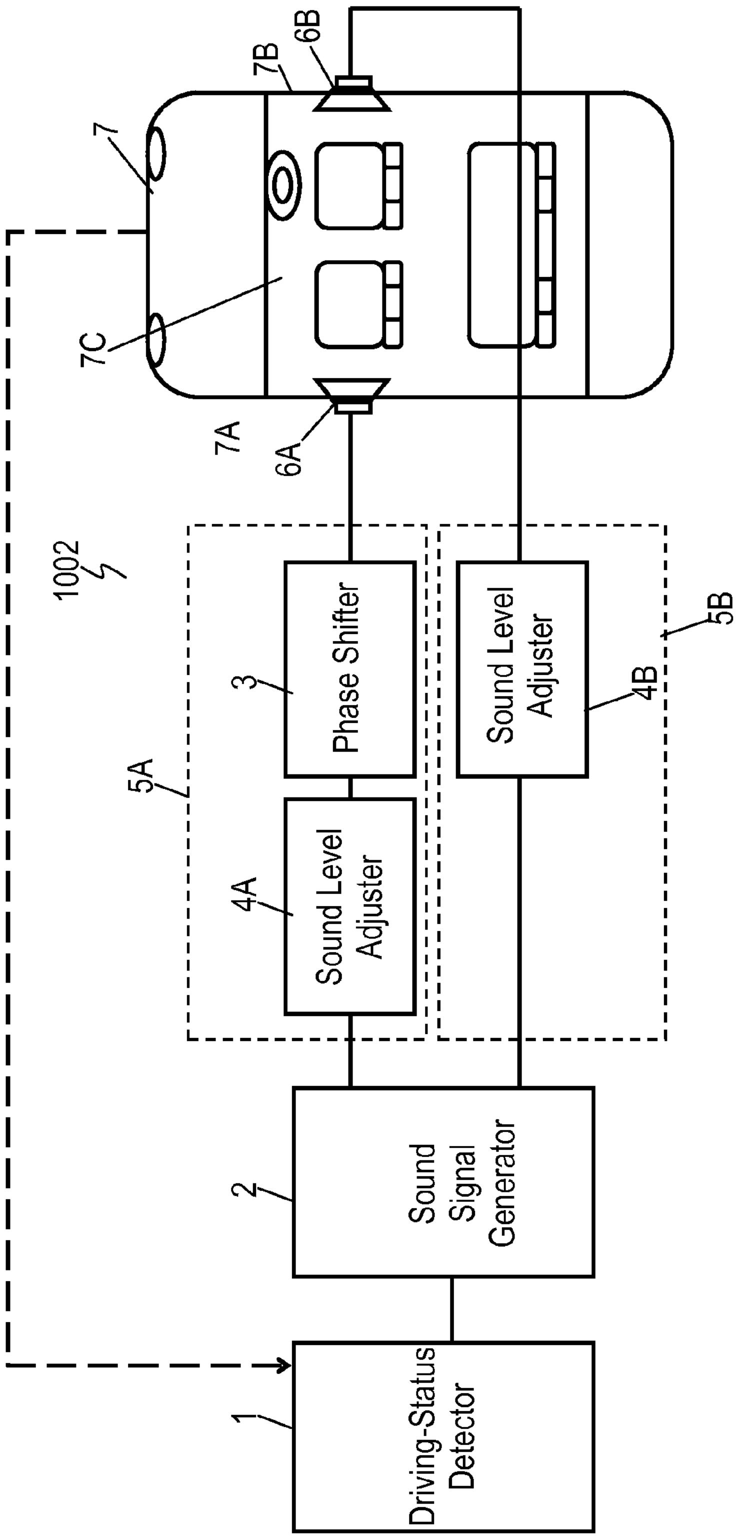
FIG. 8 is a block diagram of another sound output device according to the embodiment.

FIG. 8 is a block diagram of another sound output device 1002 according to the embodiment. In FIG. 8, components identical to those of sound output device 1001 shown in FIG. 1 are denoted by the same reference numerals. In sound output device 1002 shown in FIG. 8, phase shifter 3 is connected between sound level adjuster 4A and speaker 6A. Sound output device 1002 has the advantages similar to those of sound output device 1001.

Figure 9:
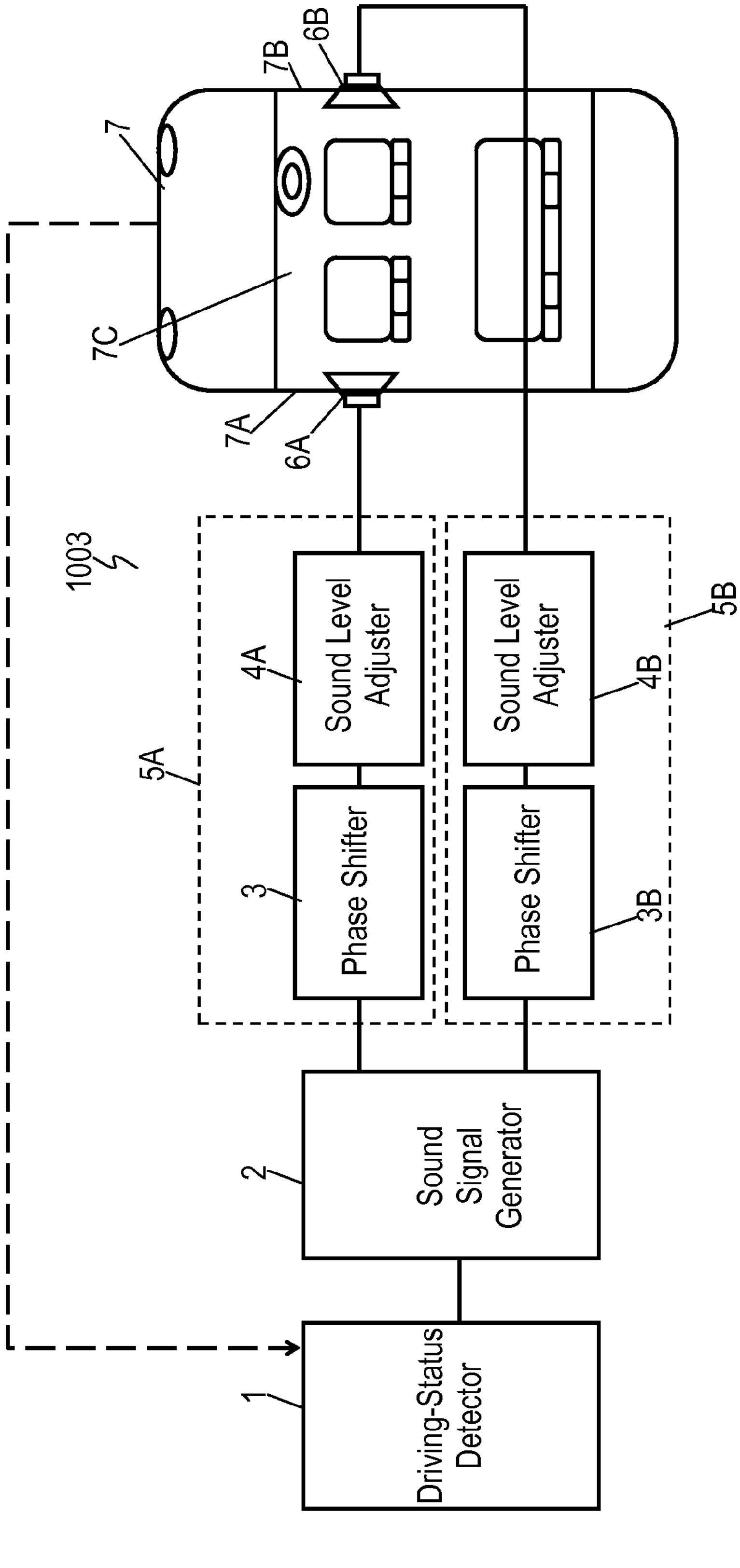
FIG. 9 is a block diagram of still another sound output device according to the embodiment.

FIG. 9 is a block diagram of still another sound output device 1003 according to the embodiment. In FIG. 9, components identical to those of sound output device 1001 shown in FIG. 1 are denoted by the same reference numerals. In sound output device 1003 shown in FIG. 9, unit 5B further includes phase shifter 3B for shifting the phase of a sound signal generated by sound signal generator 2 similarly to that of phase shifter 3. Sound output device 1003 has the advantages similar to those of sound output device 1001.

Figure 10:
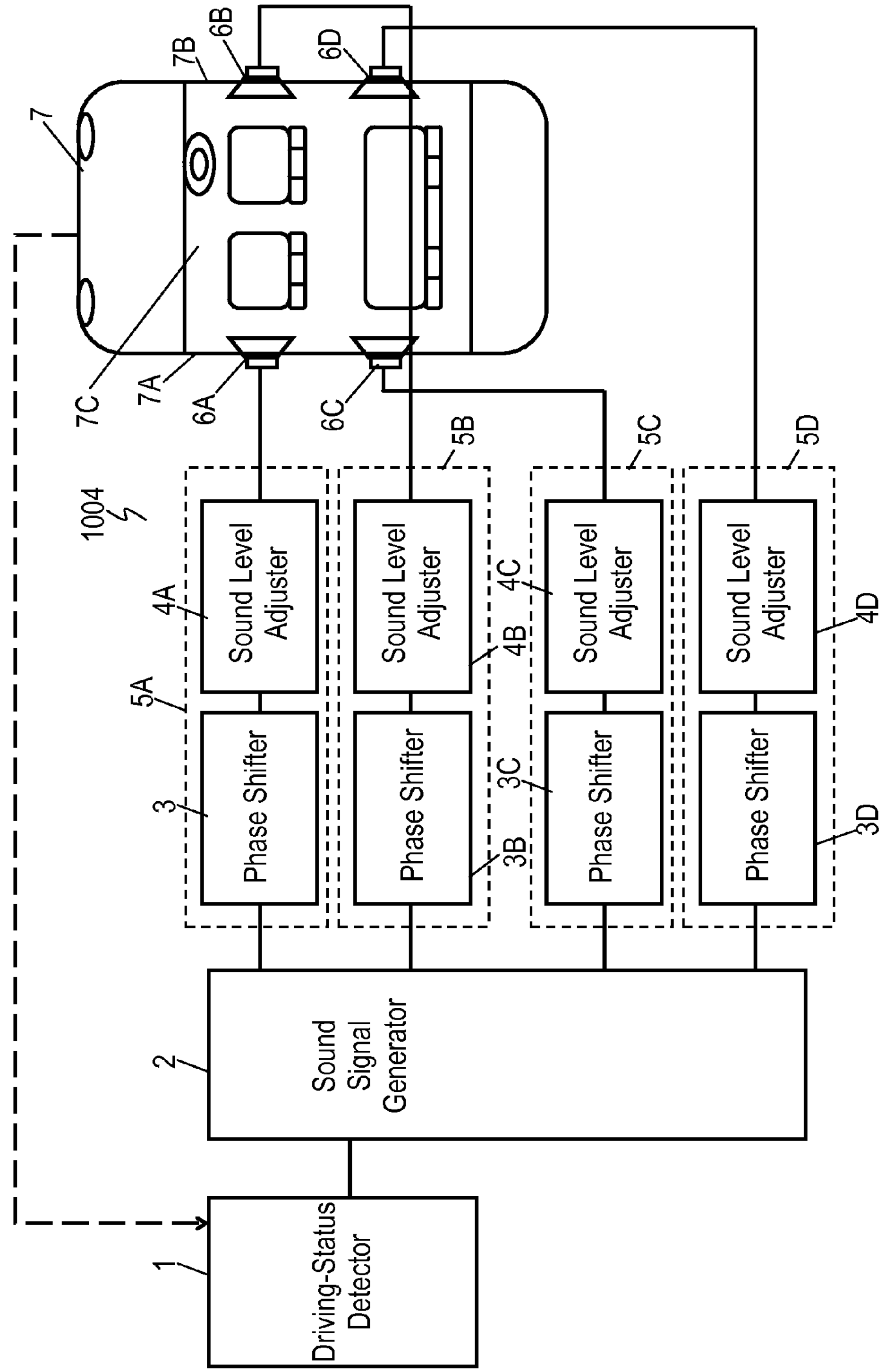
FIG. 10 is a block diagram of yet another sound output device according to the embodiment.
Figure 11:
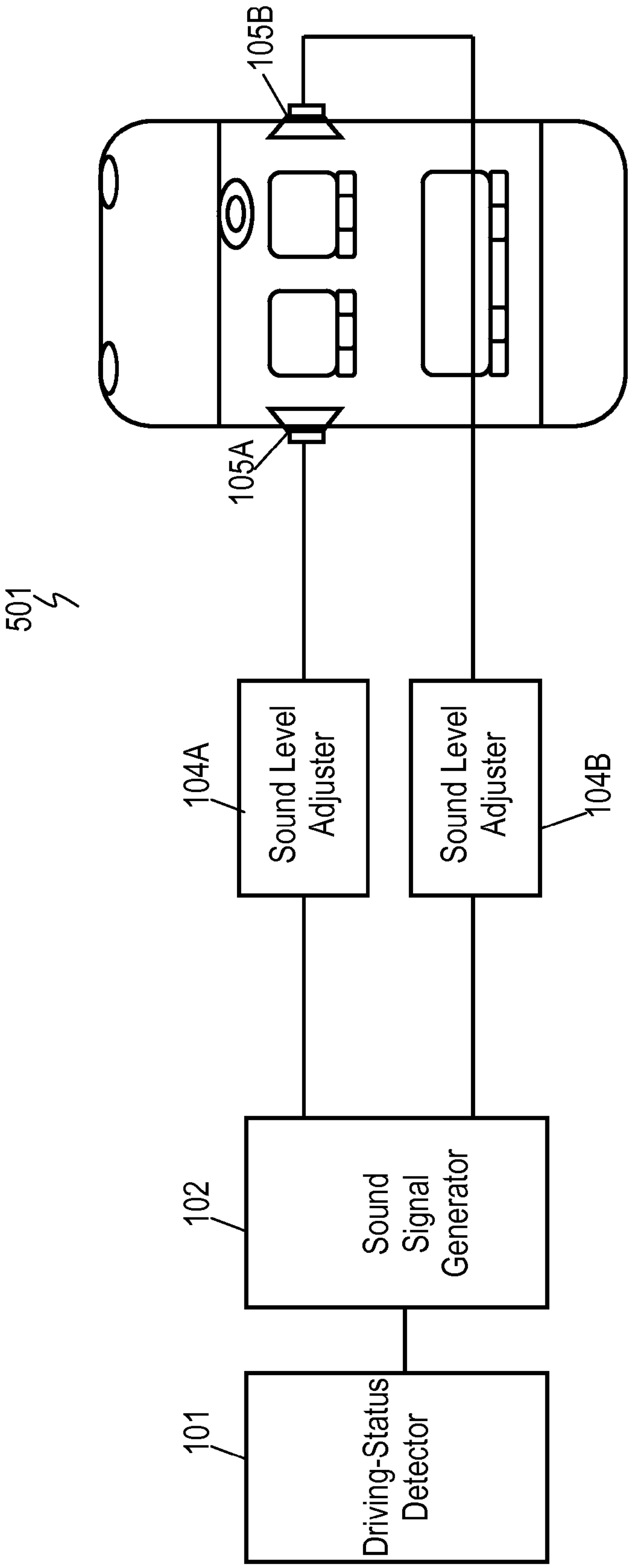
FIG. 11 is a block diagram of a conventional sound output device.

FIG. 10 is a block diagram of yet another sound output device 1004 according to the embodiment. In FIG. 10, components identical to those of sound output device 1003 shown in FIG. 9 are denoted by the same reference numerals. Sound output device 1004 further includes units 5C and 5D, and speakers 6C and 6D, i.e. sound output parts connected to units 5C and 5D, respectively, in addition to sound output device 1003 shown in FIG. 9. Unit 5C includes sound level adjuster 4C for adjusting the level of the sound signal generated by sound signal generator 2 at each frequency, and phase shifter 3C for shifting the phase of the sound signal. Unit 5D includes sound level adjuster 4D for adjusting the level of the sound signal generated by sound signal generator 2 at each frequency, and phase shifter 3D for shifting the phase of the sound signal. Speaker 6C outputs a sound signal that has a level adjusted by sound level adjuster 4C and a phase shifted by phase shifter 3C to vehicle cabin space 7C. Speaker 6D outputs a sound signal that has a level adjusted by sound level adjuster 4D and a phase shifted by phase shifter 3D to vehicle cabin space 7C. Speakers 6C and 6D are disposed on left and right wall surfaces of the rear seat of vehicle 7 facing each other. Sound output device 1004 can further reduce the dips of the sound to be heard by the passengers on the front and rear seats of vehicle 7.

INDUSTRIAL APPLICABILITY

A sound output device according to the present invention allows the passenger at a predetermined position to hear a sound in a preferable condition, and thus, is useful for various types of vehicles, such as an automobile.

REFERENCE SIGNS LIST

1 Driving-status detector
2 Sound signal generator
3 Phase shifter
5A Unit (First unit)
5B Unit (Second unit)
6A Speaker (First sound output part)
6B Speaker (Second sound output part)

The invention claimed is:

1. A sound output device configured to be installed in a vehicle, the sound output device comprising:

a driving-status detector for detecting a driving status of the vehicle;

a sound signal generator for generating a reference signal in response to the detected driving status;

a first unit for processing the generated reference signal to generate a first reference signal;

a second unit for processing the generated reference signal to generate a second reference signal;

a first sound output part for outputting the first reference signal;

a second sound output part for outputting the second reference signal; and a phase shifter for shifting a phase of the reference signal such that the respective reference signals output from the first sound output part and the second sound output part have a phase difference between the respective reference signals, wherein the sound signal generator stores a data table containing a plurality of sampling values at a plurality of points within ¼ of a cycle of a waveform of the reference signal, wherein the first unit generates the first reference signal by extracting the plurality of sampling values at output sampling periods from the data table at intervals in response to the detected driving status, wherein the second unit generates the second reference signal by extracting the plurality of sampling values at the output sampling periods from the data table at the intervals, and wherein, when the driving status is changed, the phase shifter sets a point out of the plurality of points which is to be extracted by the first unit such that the point is apart from a point out of the plurality of points to be extracted by the second unit by a number obtained by accumulating a predetermined increment at the output sampling periods to be added to a current number toward a target number corresponding to a phase for a new status.

2. The sound output device according to claim 1, wherein the first sound output part outputs a first sound signal in response to the first reference signal, wherein the second sound output part outputs a second sound signal in response to the second reference signal, and wherein, when the driving status is changed, the phase shifter sets the point out of the plurality of points which is to be extracted by the first unit such that the point is apart from the point out of the plurality of points to be extracted by the second unit by the number, as to reduce a discontinuity of one of the first sound signal and the second sound signal.

* * * * *